(No Model.) 4 Sheets—Sheet 3.
V. L. EMERSON.
LUMBER STORAGE PLANT.
No. 602,395. Patented Apr. 12, 1898.
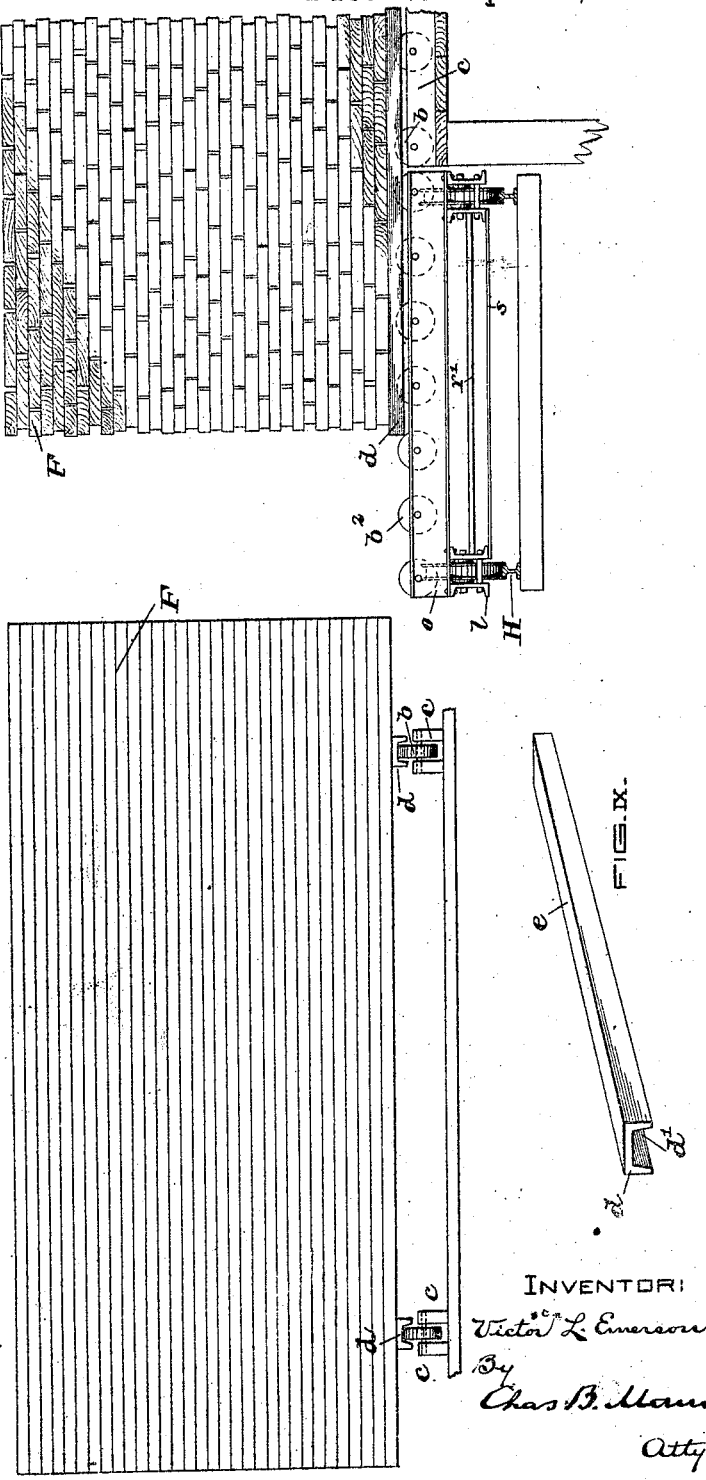

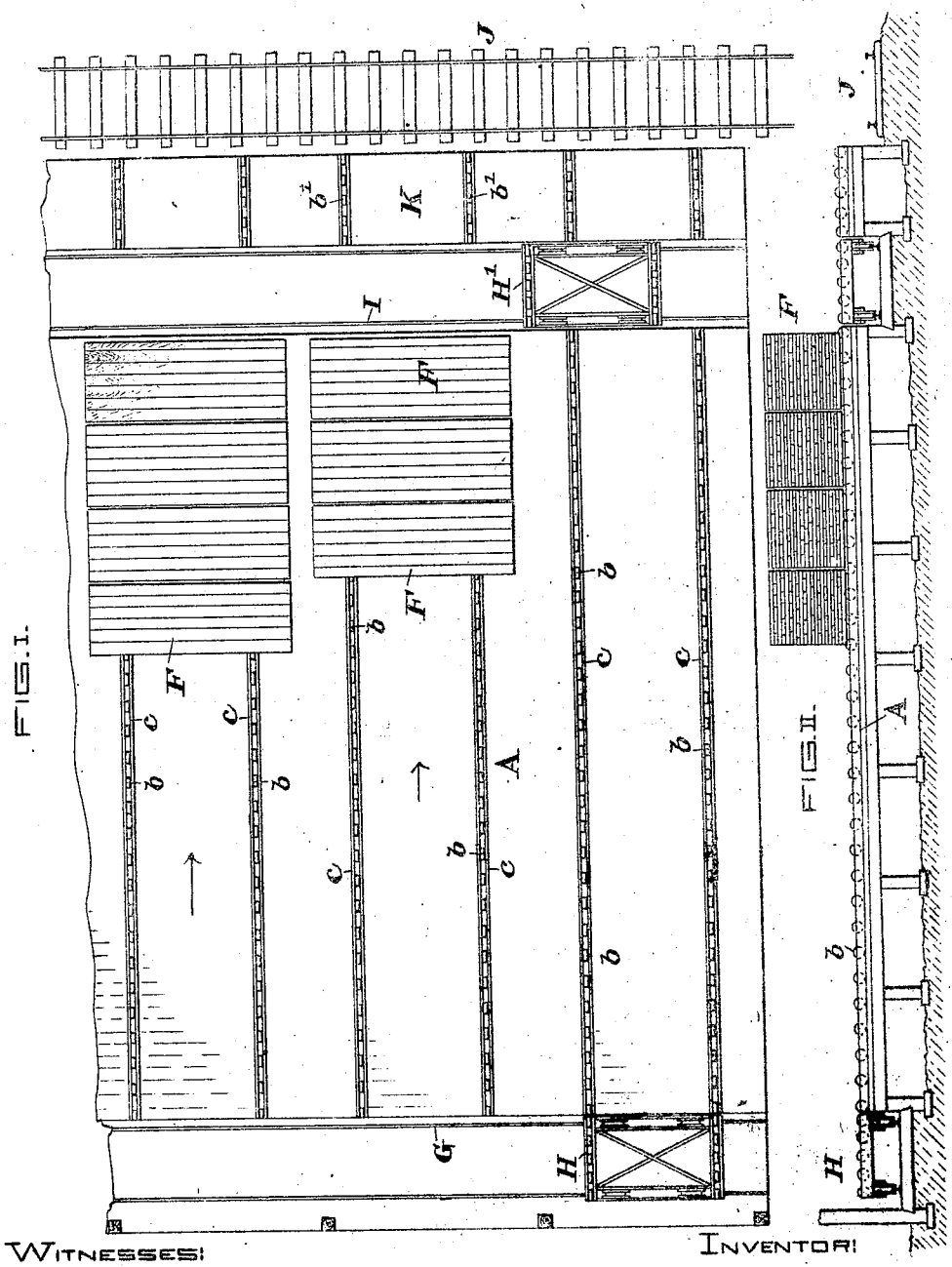

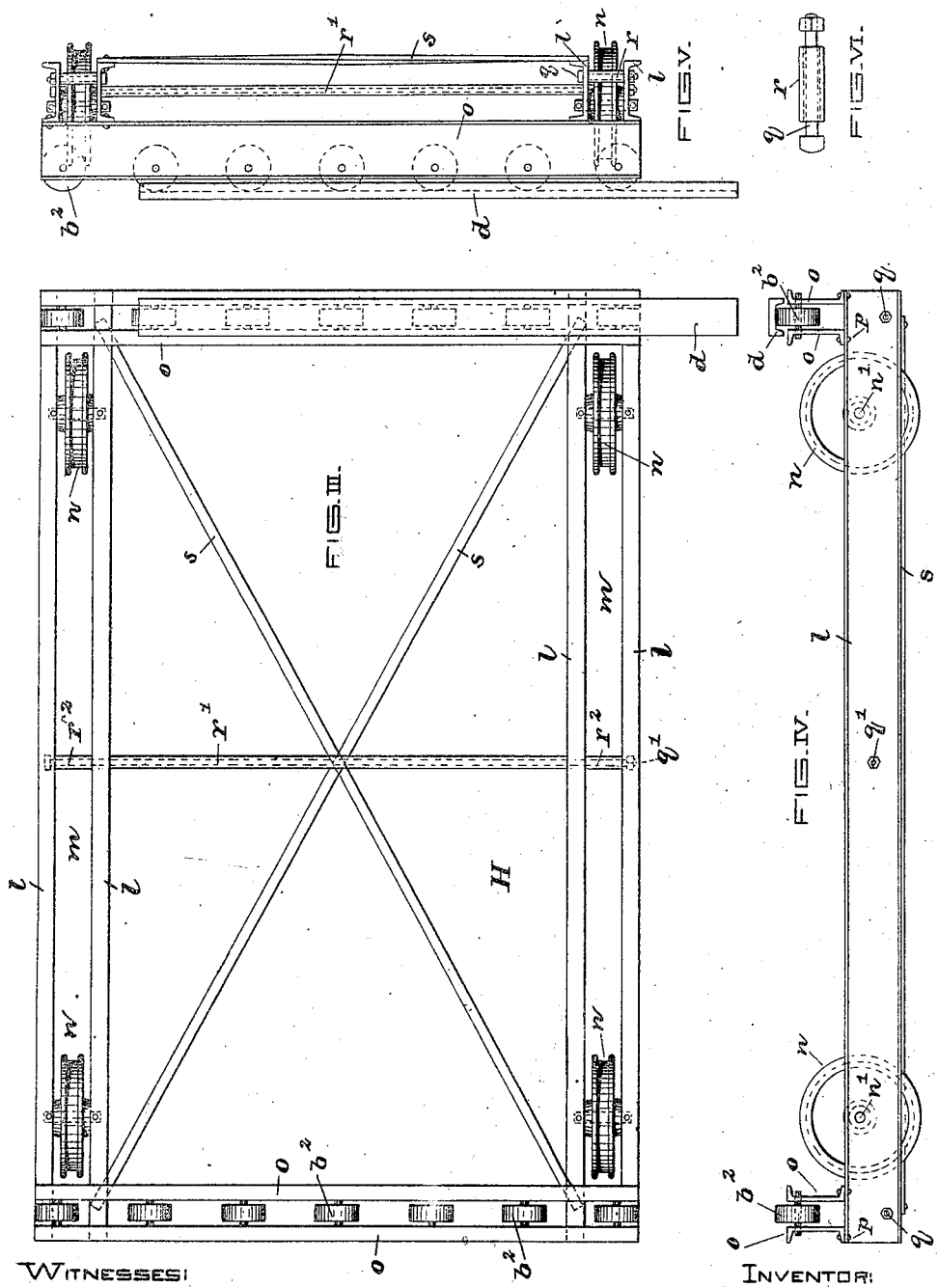

(No Model.) 4 Sheets—Sheet 4.
V. L. EMERSON.
LUMBER STORAGE PLANT.
No. 602,395. Patented Apr. 12, 1898.
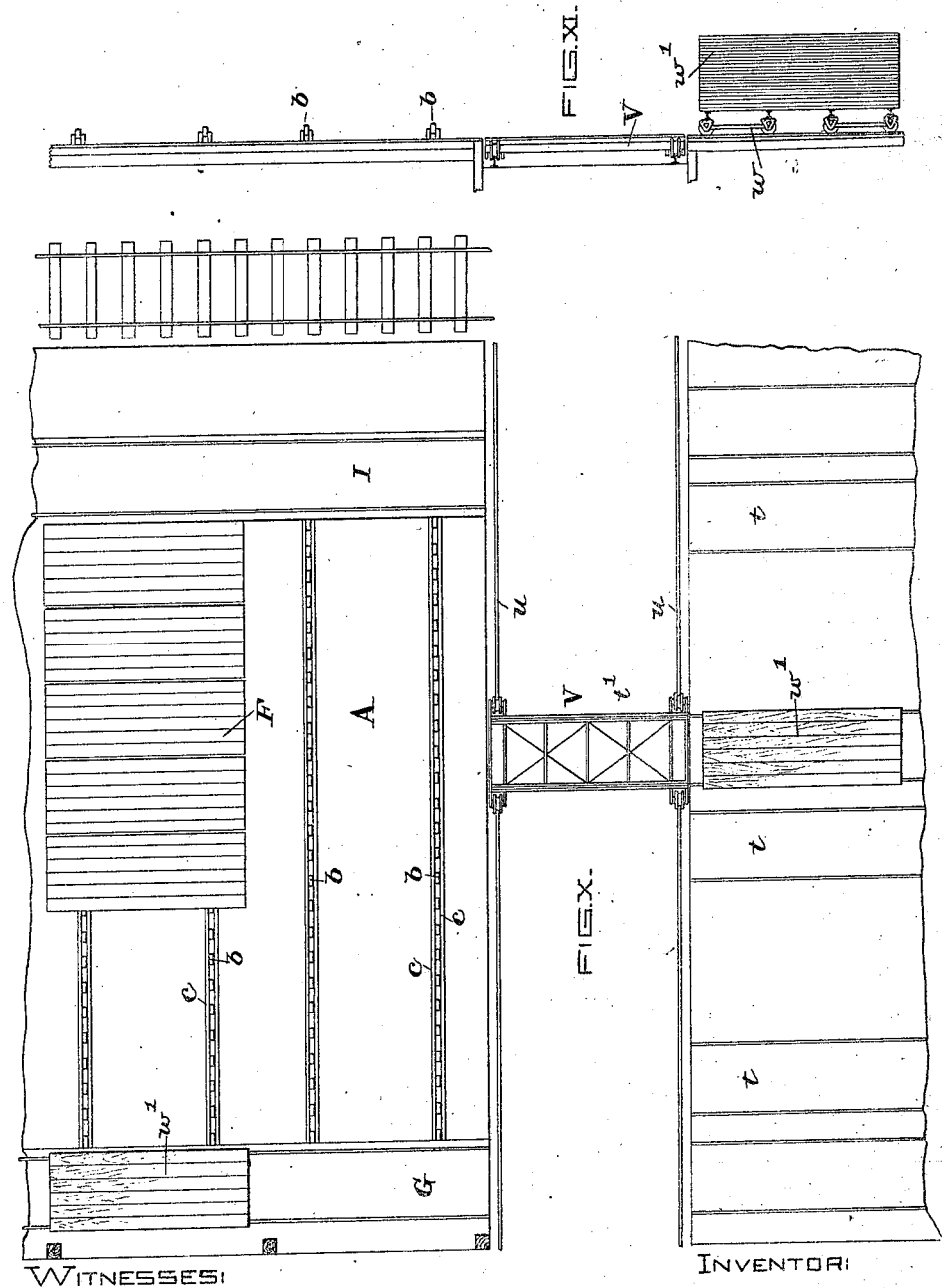
WITNESSES:
Charles B. Mann Jr.
Chapin A. Ferguson.
INVENTOR:
Victor L. Emerson
By Chas. B. Mann
Atty.

UNITED STATES PATENT OFFICE.

VICTOR L. EMERSON, OF BALTIMORE, MARYLAND, ASSIGNOR, BY DIRECT AND MESNE ASSIGNMENTS, TO THE RELIANCE DRY KILN COMPANY OF BALTIMORE CITY, OF MARYLAND.

LUMBER-STORAGE PLANT.

SPECIFICATION forming part of Letters Patent No. 602,395, dated April 12, 1898.

Application filed June 28, 1897. Serial No. 642,617. (No model.)

*To all whom it may concern:*

Be it known that I, VICTOR L. EMERSON, a citizen of the United States, residing in Baltimore, in the State of Maryland, have invented certain new and useful Improvements in Lumber-Storage Plants, of which the following is a specification.

This invention relates to a lumber-storage plant which affords improved facilities for storing and handling lumber.

In carrying out my invention as applied to yards and sheds where lumber is stored I dispense with the avenues or passages which are ordinarily left between piles of lumber to admit cars or wagons and place the lumber-piles more compactly or closely together, and thereby gain an increased storage capacity in any given space.

A lumber-shed arranged according to my invention has provision for transferring lumber from the dry-kiln trucks or any suitable carrier and entering the same into the storage-shed; also, for shifting the piles of stored lumber in bulk from one position to another in the storage-shed; also, for locating the piled lumber according to its assorted grade or quality in the said storage-shed; also, for removing the piles from the delivery end of the storage-shed, and, finally, placing the piled lumber in bulk alongside of a railroad-car in readiness to be loaded thereon, all these movements or operations of piled lumber being accomplished without the manual labor of handling or rehandling the boards, thus effecting a great economy in the saving of wages and labor and making a lumber-storage system that may be termed "continuous," because lumber can be supplied at one side of the yard or shed and removed therefrom at the opposite side at the same time without either operation interfering with the other. A construction whereby these desired results may be accomplished will be described in connection with the accompanying drawings, which illustrate one way of carrying the invention into effect.

Figure 1 is a plan view of a lumber-storage plant, the shed-roof being removed. Fig. 2 is a vertical longitudinal section of same. Figs. 3, 4, and 5 are top, side, and end views of the transfer-truck and show at one end one of the lumber-supporting bars. Fig. 6 is a detail of a bolt and tube used in the construction of the truck. Fig. 7 is a side view of a pile of lumber as it appears when stored on the bars. Fig. 8 is an end view of a pile of lumber as it appears when being shifted onto or from the transfer-truck. Fig. 9 is a perspective view of one of the lumber-supporting bars. Fig. 10 is a plan view showing a lumber-storage plant, the tracks of several dry-kilns, and a special truck for transferring the dried lumber while it rests piled on the dry-kiln trucks from the tracks of the dry-kiln to the lumber-storage shed. Fig. 11 is a vertical cross-section of same.

The place for storing lumber may be in an open yard or in a covered shed, preferably the latter.

Referring to the drawings, the letter A designates a suitable floor or horizontal or slightly-inclined support provided on its top surface with freely-revoluble rollers $b$. These rollers practically cover the entire floor area and constitute the base or support for the piled lumber. Fixed bearings $c$ sustain the said rollers $b$ with the top part of their rims exposed, and the rollers are arranged in straight lines, those comprising a line being spaced apart at short intervals. The lines of rollers are parallel, two or more lines constituting a way for one series of lumber-piles, and these series may be as numerous as the floor area or space of the shed-floor will afford room for. Bars $d$, each having a longitudinal channel $d'$ on its under side, are placed with the channel on these rollers. At least two such bars placed parallel are required to support a pile F of lumber. The top surface $e$ of each channel-bar is broad and flat, and the lowermost boards in a pile rest on said flat surface. The lumber is piled without cross-sticks between the boards. It will be understood that the entire pile of lumber thus resting on bars which are supported on the lines of revoluble rollers may be shifted or moved in bulk from one position to another in the storage-shed.

At the entrance or receiving end of the storage-shed is a cross-line G of track, on which the transfer-truck H travels, and at the delivery end is another cross-line I of track, on which a transfer-truck H' travels. A railroad-track J for ordinary freight-cars may be adjacent the delivery end, and piled lumber in bulk may be moved from the storage-shed alongside of this track to be loaded for shipment to distant points of the country. A platform K intervenes between the delivery cross-line I and the railroad-track J, and this platform has short lines $b'$ of revoluble rollers, said short lines having such position relative to the main lines of rollers $b$ in the shed as to serve as extensions of the main lines when the cross-track I is bridged over.

In this system of storing lumber in movable piles the lumber ordinarily enters the yard or shed at the receiving end, and the lumber will stand in piles F on the bars $d$ resting on the rollers, as shown in Fig. 7. The piles of lumber will be close together, as indicated in Fig. 1, and will be arranged in ranks or ways according to grade, with no wagon or car avenues, but only a narrow space between the ranks to admit a man to walk. Whenever necessary, the piles of lumber may be shifted bodily, and all lumber removed from the shed is taken out at the delivery end.

The transfer-truck H or H' has at its two longitudinal sides two parallel flanged bars $l$, and between them is an open space $m$, in which are flanged wheels $n$, mounted on fixed spindles $n'$, secured in said two bars. These wheels traverse the cross-lines G or I of track. The side bars $l$ of the truck set very low relative to the spindles $n'$ and wheels, so that the uppermost surfaces of said bars are but little above said wheel-spindles. This low set allows the end cross-bars $o$ to set on top of the side bars and yet not be too high. The end bars $o$ are secured by rivets $p$ to the flanged side bars. There are two cross-bars $o$ at each end, with a space between, and rollers $b^2$ are mounted in this space with the top parts of their rims exposed above the said cross-bars. These rollers are freely revoluble like those on the shed-floor, and the distance between the rollers at one end of the truck and those at the other end is exactly equal to the space between two lines or rollers $b$ on the floor, constituting what I have called a "way." The two bars $l$ at each side of the truck are connected together at their ends by a bolt $q$, extending through a tube $r$, which latter separates the two bars. The bolt and tube hold the two bars firmly together. A long tube $r'$ extends across the center of the truck between the innermost bars $l$ of the two sides, a short tube $r^2$ at the center is between the two bars $l$ of each side, and one bolt $q'$ extends through the four bars $l$, the two short tubes $r^2$, and the long tube $r'$, and thus binds all the parts together. Two diagonally-placed cross-bars $s$ are secured at the corners of the truck and serve as ties or braces.

The views shown in Figs. 10 and 11 illustrate the improved lumber-storage shed and cross-line tracks at each end with a longitudinal railway $u$ along one side of the shed and several dry-kiln tracks $t$ terminating at said railway. A shifting-car V travels on the longitudinal track $u$. This car has top rails $t'$ for track of same width as the dry-kiln tracks $t$ and the shed cross-tracks G and I. The dry-kiln trucks $w$, carrying lumber-piles $w^2$, with cross-sticks between the boards, as they come out of the dry-kiln travel on the tracks $t$, and said dry-kiln trucks $w$ may be moved on top of the shifting-car V, and thereby the dry-kiln trucks and their load may be shifted from the dry-kiln tracks $t$ to the entrance cross-track G or to the delivery cross-track I, as may be desired.

Having thus described my invention, what I claim is—

1. The herein-described method of storing lumber in sheds or yards consisting of piling the lumber in stacks or piles on bars which rest on freely-revoluble rollers mounted in bearings located over the floor area of the shed or yard—arranging said piles in compact or close ranks without intervening wagon or car avenues, and said piles being movable bodily.

2. The herein-described method of storing lumber in sheds or yards consisting in piling the lumber in stacks or piles on bars which rest on freely-revoluble rollers practically covering the entire floor area of the shed or yard—said piles being close together and in compact ranks extending from the receiving end to the delivery end of the shed or yard and said piles being movable bodily without handling the boards comprising the pile.

3. A lumber-storage shed having in combination a floor or horizontal support provided with freely-revoluble rollers projecting above its top surface, said rollers being arranged in a plural series of parallel lines, and movable bars which rest upon said rollers and adapted to support and carry lumber piled on said bars.

4. A lumber-storage shed having in combination a floor or support having freely-revoluble rollers projecting above its top surface, said rollers being arranged in a plural series of parallel lines; a crosswise track at the receiving end of said shed; a crosswise track at the delivery end; a transfer-car movable on said crosswise tracks, said car having at its top two series of rollers which revolve freely in a vertical plane at right angles with respect to the car-wheels, and said two series of rollers spaced apart to register with one series of said parallel-line rollers; and movable bars each having on its under side a longitudinal channel to fit on said rollers.

5. In a lumber-storage plant a transfer-truck having a frame mounted on wheels to traverse a rail-track; bars on top of said frame extending crosswise at right angles with respect to the track-wheel; and rollers mounted on said crosswise bars and revolving freely, said rollers serving for channel-bars to support the lumber.

6. A transfer-truck for lumber-storage plants having parallel bars at opposite sides; track-wheels mounted between said parallel bars; end parallel bars resting on top of said side bars and crossing them; and freely-revoluble rollers mounted between said end cross-bars.

7. In a lumber-storage plant the combination of a shed; freely-revoluble rollers fixed on the floor of said shed; lumber-supporting bars resting on said rollers; a crosswise track at each end of the shed; a longitudinal track at one side of the shed extending between and connecting the said crosswise tracks at the ends; and a car to operate on the longitudinal tracks—said car to transfer trucks with piled lumber on them.

In testimony whereof I affix my signature in the presence of two witnesses.

VICTOR L. EMERSON.

Witnesses:
CHARLES B. MANN, Jr.,
CHAPIN A. FERGUSON.